United States Patent
Kenehan et al.

(10) Patent No.: US 8,472,362 B2
(45) Date of Patent: Jun. 25, 2013

(54) METHODS AND APPARATUSES FOR DETECTING RADIO LINK FAILURE IN A TELECOMMUNICATIONS SYSTEM

(75) Inventors: Vera Kenehan, Stockholm (SE); Walter Müller, Upplands Väsby (SE); Muhammad Kazmi, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 245 days.

(21) Appl. No.: 13/121,097

(22) PCT Filed: Feb. 5, 2009

(86) PCT No.: PCT/SE2009/050119
§ 371 (c)(1),
(2), (4) Date: Mar. 25, 2011

(87) PCT Pub. No.: WO2010/039081
PCT Pub. Date: Apr. 8, 2010

(65) Prior Publication Data
US 2011/0183663 A1   Jul. 28, 2011

Related U.S. Application Data

(60) Provisional application No. 61/101,264, filed on Sep. 30, 2008.

(51) Int. Cl.
*G08C 17/00*      (2006.01)
(52) U.S. Cl.
USPC ........ 370/311; 370/329; 370/330; 455/67.11; 455/67.13; 455/458; 455/515; 455/574
(58) Field of Classification Search
USPC ............... 455/421, 436, 67.11, 67.13, 450, 455/458, 574, 515; 370/311, 329, 330
See application file for complete search history.

(56) References Cited

U.S. PATENT DOCUMENTS

| | | | |
|---|---|---|---|
| 8,265,080 B2 * | 9/2012 | Cai et al. | 370/395.2 |
| 2005/0032555 A1 * | 2/2005 | Jami et al. | 455/574 |

(Continued)

FOREIGN PATENT DOCUMENTS

WO   2008/114130 A2   9/2008

OTHER PUBLICATIONS

Office Action in corresponding European Patent Application No. 09 788 480.3-2412 dated Sep. 13, 2012.

(Continued)

*Primary Examiner* — Olumide T Ajibade Akonai
(74) *Attorney, Agent, or Firm* — Potomac Patent Group, PLLC

(57) ABSTRACT

The embodiments of the present invention relate to a method in UE (400) and a UE (400) configured to adapt at least one higher layer filtering parameter used for radio link failure detection between the UE (400) and a base station (600) in a telecommunications system (200). The embodiments of the present invention further relate to a base station (600) and a method in the base station (200). According to an embodiment of the present invention, the UE (400) is configured to operate in a discontinuous reception (DRX) mode having at least one DRX cycle; and is further configured to adapt at least one parameter as a function of a current DRX cycle the UE is using. The UE (400) is further configured to evaluate radio link failure detection based on the parameters. After evaluation, the UE (400) is further configured to evaluate radio link failure detection based on the one or several adapted parameters. After evaluation, the UE (400) is arranged to inform the base station (600) on radio link conditions.

31 Claims, 6 Drawing Sheets

301 — ADAPTING AT LEAST ONE PARAMETER AS A FUNCTION OF A CURRENT DRX CYCLE THE UE IS USING

302 — EVALUATING THE RADIO LINK FAILURE DETECTION BASED ON THE ADAPTED PARAMETER(S)

U.S. PATENT DOCUMENTS

| | | | | |
|---|---|---|---|---|
| 2008/0101268 | A1* | 5/2008 | Sammour et al. | 370/311 |
| 2008/0181127 | A1* | 7/2008 | Terry et al. | 370/252 |
| 2008/0232310 | A1* | 9/2008 | Xu | 370/329 |
| 2009/0003254 | A1* | 1/2009 | Hattig | 370/311 |
| 2009/0054006 | A1* | 2/2009 | Cai et al. | 455/73 |
| 2009/0073907 | A1* | 3/2009 | Cai | 370/311 |

OTHER PUBLICATIONS

Ericsson; "E-UTRA Out-of-Sync and In-Sync Requirements in DRX"; 3GPP TSG-RAN WG4 Meeting #48bis; Agenda Item 6.1.2.3; R4-082490; Sep. 29-Oct. 3, 2008; pp. 1-3; Edinburgh, Scotland.

3GPP TS 25.214 V7.4.0 entitled: "3rd Generation Partnership Project; Technical Specification Group Radio Access Network; Physical;Physical Layer Procedures (FDD) (Release 7)," Mar. 2007, pp. 1-76.

3GPP TS 36.300 V8.1.0 entitled: "3rd Generation Partnership Project; Technical Specification Group Radio Access Network; Evolved Universal Terrestrial Radio Access E-UTRA and Evolved Universal Terrestrial Radio Access Network (E-UTRAN) Overall description; Stage 2 (Release 8)," Jun. 2007, pp. 1-106.

3GPP TS 36.331 V8.3.0 entitled: "3rd Generation Partnership Project; Technical Specification Group Radio Access Network; Evolved Universal Terrestrial Radio Access; E-UTRA Radio Resource Control (RRC); Protocol specification (Release 8)," Sep. 2008, pp. 1-178.

Ericsson "E-UTRA Outside-of Sync an In-Sync Requirements in DRX" 3GPP Draft; R4-082490 Out of Sync Detection DRX 3rd Generation Partnership Project (3GPP) Mobile Competence Centre; 650 Route Des Lucioles; F-06921 Sophia-Antipolis Cedex; France, No. Scotland; 20080929; Sep. 29, 2009 XP050325750.

Ericsson "Value ranges of RRC timers" 3GPP Draft; R2-084809 Value Ranges of RRC Timers, 3rd Generation Partnership Project (3GPP) Mobile Competence Centre; 650 Route Des Lucioles; F-06921 Sophia-Antipolis Cedex; France, No. Jeju; 20080818 Aug. 18, 2008;XP050319759.

International Search Report issued in application No. PCT/SE2009/050119, dated Jun. 2, 2009.

* cited by examiner

| 501 | SIGNALLING A SCALING FACTOR TO THE UE WHICH ADAPTS PARAMETER(S) AS A FUNCTION OF THE SCALING FACTOR AND THE DURATION OF THE CURRENT DRX CYCLE |

| 502 | RECEIVE FROM UE INFORMATION RELATING TO REPORTING ON RADIO LINK CONDITIONS AFTER UE EVALUATED RLF DETECTION BASED ON ADAPTED PARAMETER(S) |

FIGURE 5

METHODS AND APPARATUSES FOR DETECTING RADIO LINK FAILURE IN A TELECOMMUNICATIONS SYSTEM

TECHNICAL FIELD

The embodiments of the present invention relate generally to the field of radio link monitoring in a cellular telecommunications system, and, more particularly, to a method and a user equipment (UE) for evaluating and for detecting radio link failure between the UE and a base station (e.g. a serving base station) in a cellular telecommunications system.

BACKGROUND

The 3$^{rd}$ Generation Partnership Project (3GPP) is responsible for the standardization of the UMTS (Universal Mobile Telecommunication Service) system, and LTE (Long term Evolution) is now under discussion as a next generation mobile communication system of the UMTS system. LTE is a technology for realizing high-speed packet-based communication that can reach a data rates of about 100 Mbps on the downlink and about 50 Mbps on the uplink. To this end, schemes and mechanisms are under discussions, for example, a scheme to reduce the number of network nodes in conventional UMTS networks. As an example, the base station in LTE, also known as eNB (enhanced Node B) or eNodeB, will perform the functions of a conventional radio access network (RNC) node and of a UMTS Node B. In addition, eNodeBs in LTE will interact directly with the core network and with other eNodeBs.

Irrespective of the wireless or mobile communication system used, radio link monitoring is vital to maintain radio connections. By regularly reporting the radio conditions to the system, different types of actions can be taken when radio link failure occur. In e.g. UTRA (UMTS Terrestrial Radio Access Network), the physical layers estimate the quality of the radio links and report, on radio frame basis, the synchronisation status to higher layers. The synchronization status are reported via so called synchronisation primitives which are described in greater details in the technical specification 3GPP TS 25.214 V7.4.0 entitled: "*Physical Layer Procedures (FDD)*".

The mechanism of reporting radio link quality status is also specified in E-UTRA (Evolved UTRA), in which a fast and reliable detection of radio problems is considered essential in order to avoid unnecessary interference in uplink, waste of resources in downlink and unnecessarily long delays before e.g. reselection or handover of a UE can take place.

The radio link failure handling in E-UTRA (Enhanced-UTRA) is described in the technical specifications 3GPP TS 36.300 V8.1.0 entitled: "*E-UTRA and Evolved Universal Terrestrial Radio Access Network (E-UTRAN) Overall description; Stage 2*". The handling of radio link failure described in these specifications consists of two phases as illustrated in FIG. 1. As shown, the first phase is started upon radio problem detection which may lead to radio link failure detection after that e.g. a timer period has expired (the timer is denoted T1 in FIG. 1). In this first phase, user mobility is still controlled and managed by the network. This means the network can perform handover.

As shown, the second phase is started upon radio link failure detection which may lead to a so called radio resource control (RRC) state transition from a connected mode to an idle mode after the expiry of e.g. a timer, denoted T2 in FIG. 1. In this second phase, the network loses control over the UE. Therefore UE autonomously takes mobility related decision in accordance with the specified UE behaviour.

As mentioned earlier, the judgment (and reporting) of radio problem detection, as well as procedures for its reporting, is handled by the physical layer. The analogy with UTRA refers to the use of, the previously mentioned, synchronization primitives, e.g. the out of synchronization (out-of-sync) handling.

As an example, for E-UTRA downlink, the UE monitors radio link quality of the serving base station (or serving cell), in RRC connected (RRC_CONNECTED) mode, in order to indicate radio problems to higher layers. If the UE is not operating in a so called discontinuous reception mode (DRX mode), the physical layer in the UE checks, in every frame, the quality of the radio link measured over certain evaluation duration (e.g., 100 ms or 200 ms or any other suitable value) and compares against defined thresholds denoted Qin and Qout. When the radio quality determined by the UE is worse (or less) than the threshold Qout, the UE indicates radio problem or the so called out of synchronization to higher layers. The UE continues indicating radio problems until the quality becomes better than the threshold Qin. It is the higher layer(s) that triggers the start and stop of monitoring i.e. radio problem detection.

In addition to the above mentioned thresholds used to detect radio link problems, there are additional so called higher layer filtering parameters that can be used in order to further increase the reliability of radio link failure detection especially for the cases where the UE applies DRX and can avoid "ping-pong" between in-synchronization and out-of-sync. These parameters are known as hysteresis counters and timers. It should be noted that additional parameters and coefficients can also be used, but typically timers and counters are used. As an example, UTRA relies on timers and counters, denoted in the previously mentioned technical specification (3GPP TS 25.214), by N313 and N315. These are configured by higher layers i.e. via the network. They generally count the number of out-of-sync and in-sync indications. For E-UTRA, higher layer filtering parameters such as timers and counters are described in the technical specification 3GPP TS 36.331 V8.3.0 entitled: "*E-UTRA Radio Resource Control (RRC); Protocol specification (Release 8)*". One of the timers mentioned in this technical specification and which relates to radio link failure detection and actions to be performed is denoted T310. It should be noted that additional timers are described in this technical specifications.

As mentioned before, the E-UTRA allows operation in DRX mode in RRC connected mode (also known as LTE_ACTIVE mode). DRX is an ongoing work on the LTE network (i.e. on UTRAN-LTE), and is a mechanism defined to save battery time and resources of a UE. With DRX a UE can turn on and off reception of layer 1/layer 2 (L1/L2) control in radio resource control connected state or connected mode, i.e. when the UE has established an RRC connection with the serving network.

In order to save battery time, the connected mode UE, while being in sleep mode during a predetermined DRX cycle period, wakes up at specific timings in order to check/monitor for possible control channels allocated by the LTE base station (i.e. eNB) to determine if there is data to receive. When there is no data to receive, the UE switches to the sleep mode and stays in the sleep mode until the next wake-up time. The control channel checked/monitored by the UE during the wake-up time is known as PDCCH (Physical Downlink Control Channel). When there is data to receive, the UE receives the data from the eNB and sends a response signal (ACK/NACK) indicating a successful or a failure in the reception of the data transmitted. As an example, DRX uses one or two predefined cycles (long and/or short cycles) at the beginning of which the UE should monitor the PDCCH over a certain amount of TTIs (Transmission Time Interval) under a so called Active Time. During the Active Time, the UE monitors the PDCCH for PDCCH-subframe(s). The number of consecutive PDCCH-subframe(s) at the beginning of the DRX cycle (i.e. during the Active Time) is known as the "On-duration Timer". The On-duration timer in the beginning of each cycle also defines how long a UE should monitor the PDCCH and is also based on the system frame number (SFN), specified as an integer offset. The PDCCH can carry both downlink assignments as well as uplink grants scheduled by eNB. It should be noted that the same DRX mechanism is used both for the downlink (DL) and the uplink (UL).

Whether the UE is awake (i.e. monitors the PDCCH) or is asleep after the On-duration period depends on activity, i.e. possible receptions of PDCCH control data during that period. When the UE successfully decodes a PDCCH assignment or grant, it re(starts) the so called inactivity timer. The inactivity time extends the time during which the UE further monitors the PDCCH.

It should be mentioned that the network configures the DRX via the higher layers (i.e. by RRC). The UE can be configured to use long DRX cycle or the short DRX cycle or both. The UE always follow one DRX cycle at any moment even if two DRX cycles (i.e. short and long DRX) are configured. The network (i.e. higher/upper layers) can configure a DRX cycle between e.g. 2 ms and up to e.g. 2.56 seconds depending upon the type of service e.g. 2-20 ms for voice over internet protocol (VoIP) and e.g. 1-2 seconds for browsing on the Internet.

As mentioned before, when DRX is used, the UE tries to stay inactive as much as possible during the silent periods of the DRX cycle to save its battery. However, this also implies that the UE will mainly perform measurements at the wake up instances for e.g. mobility reasons; radio link problem detection (e.g. out-of-sync detection and in-sync detection) etc.

A drawback with this is that due to the insufficient measurement opportunities in DRX mode (depending upon DRX cycle) it is possible that the UE would be unable to promptly detect the radio link problem.

Furthermore, it is likely that a very large number of UEs are kept in DRX mode and the network can abruptly switch one or several UEs to operate in continuous reception mode in order to transmit data. Thus the UE(s) should stay well connected in terms of radio link quality and so any radio link problem(s) should be reported to the network promptly. In other words, it is important that the radio link problem detection is designed to work effectively in both DRX and non-DRX (i.e. continuous) modes of operation. But since the number of measurements samples, that are required to achieve estimation accuracy equivalent to non-DRX mode, can be relatively large, a UE operating in DRX mode may fail to promptly detect radio link problems due to the insufficient measurement opportunities (i.e. evaluation periods) by the UE in DRX mode.

SUMMARY

It is thus an object of the exemplary embodiments of the present invention to address the above mentioned problems and to provide a method and an apparatus corresponding to a UE, that allow effective and reliable detection of radio link failure when the UE is operating in DRX mode and thus to minimize interference in the network and to avoid unnecessary long delays before e.g. cell reselection and/or handover.

The exemplary embodiments of the present invention also provide a method and an apparatus corresponding to a base station that is e.g. serving the UE.

According to a first aspect of embodiments of the present invention, the above stated problem is solved by means of a method for use in a UE, for detection of radio link failure between the UE and a base station. The UE is capable of operating in a DRX mode having at least one DRX cycle (e.g. a long DRX cycle or a short DRX cycle). The method comprises: adapting at least one parameter, used in radio link failure evaluation, as a function of a current DRX cycle the UE is using; and evaluating radio link failure detection based on the adapted parameter.

As an example, the parameter to be adapted as a function of the current DRX cycle the UE is using could be a counter that is used to count the number of consecutively reported out-of-sync and in-sync indications from lower layer in order to detect radio link failure.

Another example of a parameter to be adapted as a function of the current DRX cycle the UE is using could be a timer that is started upon detection of physical layer problems either upon indication from physical layer (i.e. upon passing a predefined threshold) or after additional higher later filtering using counters. Additional examples of parameters and exemplary embodiments of the present invention will be described in greater details in the detailed description part and in the drawings.

According to another aspect of embodiments of the present invention, the above stated problem is solved by means of a UE capable in detecting radio link failure between the UE and a base station. The UE comprises: means for operating in DRX mode having at least one DRX cycle; means for adapting at least one parameter, used in radio link failure evaluation, as a function of a current DRX cycle the UE is using; and means for evaluating radio link failure detection based on said at least one adapted parameter.

According to an embodiment of the present invention, the UE is further configured to adapt the one or several parameters as a function of the duration of the current DRX cycle and as a function of a scaling factor which can be predetermined or received by the base station.

According to yet another aspect of embodiments of the present invention, the above stated problem is solved by means of a base station for enabling a UE to detect radio link failure between the UE and the base station. The UE is configured to operate in DRX mode having at least one DRX cycle. The base station comprises means for transmitting a scaling factor to the UE which adapts at least one parameter, used in radio link failure evaluation, as a function of a current DRX cycle that is used and as a function of the scaling factor. The base station further comprises means for receiving information from the UE after evaluation by the UE of the radio link based on said at least one adapted parameter. The information relates to a reporting by the UE on radio link conditions.

According to a further aspect of embodiments of the present invention, the above stated problem is solved by means of method for use in a base station for enabling a UE to detect radio link failure between the UE and the base station. The method comprises: transmitting a scaling factor to the UE which is configured to operate in DRX mode having a DRX cycle, and which is further configured to adapt at least one parameter, used in radio link evaluation, as a function of the current DRX cycle and as a function of the scaling factor. The method further comprises: receiving information from the UE after evaluation by the UE of the radio link based on said at least one adapted parameter. The information relates to a reporting by the UE on radio link conditions.

An advantage with embodiments of the present invention is to achieve reliable radio problem detection even when a UE is operating in DRX mode and in scenario with limited measurements opportunities.

Another advantage with embodiments of the present invention is to reduce signalling and configuration for the UEs that are configured with DRX operation;

Yet another advantage with embodiments of the present invention is to avoid reconfiguring radio link failure monitoring parameters due to DRX operation.

Still other objects and features of the embodiments of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

BRIEF DESCRIPTION OF THE DRAWINGS

FIG. 5 is a diagram illustrating a flowchart of a method performed in a base station according to exemplary embodiments of the present invention.

DETAILED DESCRIPTION

In the following description, for purposes of explanation and not limitation, specific details are set forth such as particular architectures, scenarios, techniques, etc. in order to provide thorough understanding of the exemplary embodiments of the present invention. However, it will be apparent from the person skilled in the art that the exemplary embodiments of the present invention may be practiced in other embodiments that depart from these specific details.

The different embodiments of the present invention are described herein by way of reference to particular example scenarios. In particular the embodiments are described in a non-limiting general context in relation to a communications network based on the third generation (3G) LTE concept. It should be noted that the embodiments of the present invention are not restricted to 3G LTE but can be applicable in other wireless systems that employ discontinuous reception (DRX) such as UMTS, WiMAX (worldwide interoperability for microwave access), or HSPA (high speed packet access) or WCDMA (wideband code division multiple access) or HSDPA (high speed downlink packet access) or HSUPA (high speed uplink packet access).

Figure 1:
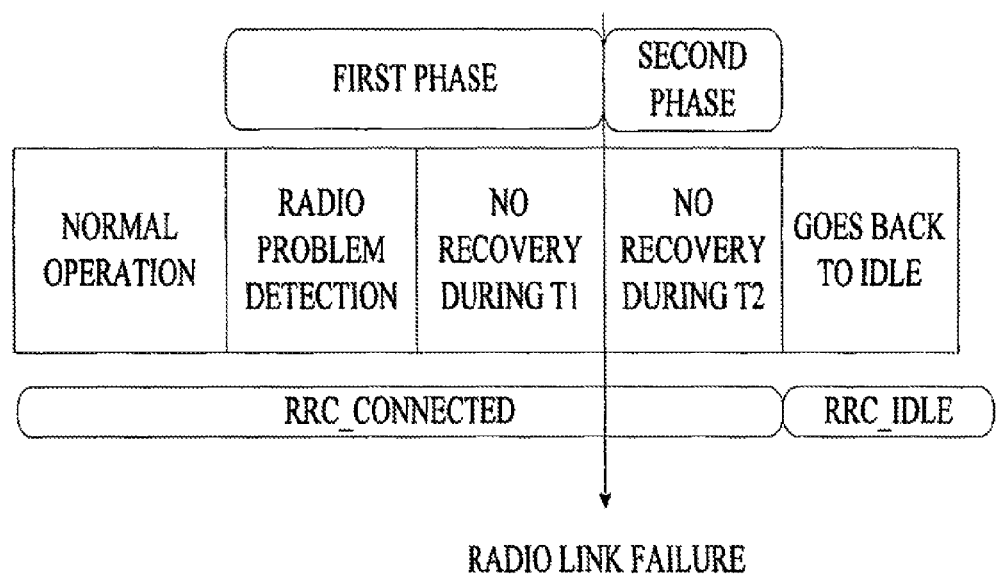
FIG. 1 is a diagram illustrating an example of a prior art scheme on how to handle radio link failure in E-UTRA.
Figure 2:
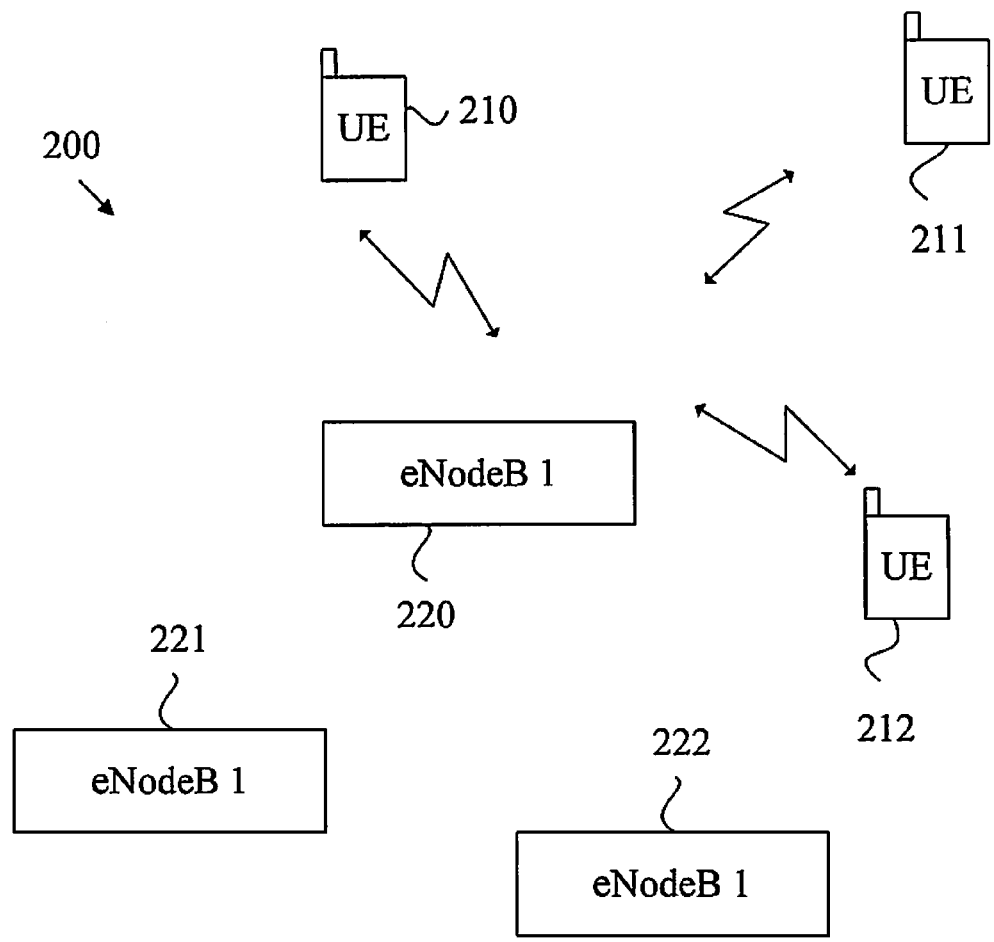
FIG. 2 is a diagram illustrating an example of a wireless network telecommunications system wherein exemplary embodiments of the present invention can be applied.

Referring to FIG. 2, there is illustrated a block diagram of an exemplary wireless telecommunications network system 200 in which the different exemplary embodiment of the present invention may be applied. Note that the system depicted in FIG. 2 only shows transceivers or apparatus or nodes that are necessary for understanding the different exemplary embodiments of the present invention. As shown, the system 200 which is here considered to represent a simplified 3GPP LTE system, comprises a number of apparatuses acting as user equipments UE 210, UE 211, UE 212, and apparatuses acting as radio base stations and denoted eNodeB 1 220, eNodeB 2, 221 and eNodeB 3 222. One of the functions of the eNodeBs (or eNBs) is to control traffic to and from UEs in a cell. A UE is suitable to be used as a mobile phone, a wireless terminal, a laptop, a personal computer, a personal digital assistant, a voice over internet protocol (VoIP) capable phone or any other 3GPP LTE capable equipment. Traffic, over a radio link, from a eNodeB to a UE is referred to as downlink (DL) traffic and traffic, over a radio link, from the UE to a eNodeB is referred to as uplink (UL) traffic. Note that in FIG. 2, the number of UEs and eNodeBs is only illustrative and the embodiments of the present invention are not restricted to any particular number of UEs and/or number of eNodeBs and/or number of cells per eNodeB.

The exemplary LTE (i.e. E-UTRA) system 200 shown in FIG. 2 and the procedures in it allow the network to configure discontinuous reception (DRX) mode as well as non-DRX mode (i.e. continuous mode). As mentioned previously, in order to detect radio link failure and to take necessary measures following the failure, there are quantities to be estimated for reporting in-synchronization (in-sync) status and out-of synchronization (out-of-sync) status. An example of such quantity is the quality of the radio link between the UE and a eNodeB (such as a serving eNodeB). For example, when the UE is in non-DRX mode of operation, the physical layer in the UE checks/monitors, in every defined frame, (i.e. a radio frame as defined in LTE), the quality of the radio link between it and the serving eNodeB and compares it with defined thresholds known as Qin (in for in-sync) and Qout (out for out-of-sync). The quality of the radio link is measured over certain evaluation duration (e.g. 100 ms, 200 ms in non-DRX mode). A radio link is said to be in-sync if it is available to successfully receive data i.e. if the quality of the radio link is better than threshold Qin. Otherwise the radio link is said to be in failure, i.e. it is out-of-sync, or similarly, the quality of the radio link is worse than threshold Qout.

When the physical layer in the UE determines the in-sync status and out-of-sync status of every radio frame, it reports the results to the higher layer i.e. the radio resource control (RRC) layer using the primitives physical layer message in-sync indicator and physical layer message out-of-sync indicator. The RRC layer will declare the physical layer establishment or failure whenever appropriate based on these indicators and associated timers and counters. The timers and counters count the number of consecutive out-of-sync and in-sync indications. These counters and timers are also known as higher layer filtering parameters.

In non-DRX mode of operation the evaluation periods of Qout and Qin, and associated timers and counters, are relatively long and thus radio link failure can be promptly reported to higher layers.

Therefore, in order to achieve estimation accuracy equivalent to non-DRX case, the higher layer filtering parameter(s) is/are, according to exemplary embodiments of the present invention, adapted/extended/expressed as a function of a current DRX cycle that a UE is using. That way the UE has opportunity to obtain sufficient number of measurement samples in order to evaluate and declare radio link problem since the evaluation periods of Qin and Qout will be long enough.

As an example, when the UE is operating in a DRX mode having a short (or long) DRX cycle, the UE is configured to adapt e.g. one or several higher layer filtering parameters (such as counters and timers), used in radio link failure evaluation, as a function of the duration of the short DRX cycle, and then use these parameters when evaluating radio link failure detection. The UE can e.g. start the adapted timer upon detecting physical layer problems upon indication from the physical layer. The indication from the physical layer is triggered upon passing the previously described Qout threshold i.e. when the measured quality of the radio link is worse than the Qout threshold.

As previously described, higher layer filtering parameters may include one or several counters that are also, in accordance with an exemplary embodiments of the present invention, adapted/expressed as a function of the DRX cycle (e.g. as a function of the length or duration of the DRX cycle). As an example, an adapted counter, denoted here Coos, counts the number of consecutively reported Qout and another adapted counter, denoted Cis, counts the number of Qin indications from the physical layer. Thus, when the number of Qout indications reaches Coos the above mentioned timer is triggered and when the number of Qin indications reaches Cis the timer is stopped. When the timer expires the radio link failure is declared by the UE.

According to another example, a single counter may be initialized to a value that is modified every time the lower layer (i.e. the physical layer in UE) provides Qout indication by, for example, decrementing the counter. The counter may also be modified every time the UE indicates Qin indicating by, for example, incrementing the counter. Once the counter reaches e.g. zero value, the above mentioned timer is started.

According to another exemplary embodiment of the present invention, the UE is configured to adapt/express one or several higher layer filtering parameters, as a function of the DRX cycle and a scaling factor. The scaling factor may be dependent on the service used and/or network implementation, i.e. it can be a design parameter etc.

According to an exemplary embodiment of the present invention, the UE is configured to scale e.g. the counter for out-of-sync Coos as a function of the current DRX cycle the UE is using and as a function of a scaling factor, denoted $K_1$. As an example, Coos at DRX cycle length i can be expressed as a function F of $K_1$ and DRX cycle, denoted $D_{DRX}$ as follows:

$$Coos(i) = F(K_1, D_{DRX,i}) \quad (1)$$

A suitable function can be expressed according to equation (2) below:

$$Coos(i) = K_1 \times D_{DRX,i} \quad (2)$$

As given in equation (2), the adaptation of the counter Coos(i) is performed by the UE by scaling the current DRX cycle having length i, $D_{DRS,1}$. Note that the type of DRX cycle that is currently used can be a long DRX cycle or a short DRX cycle or any other type of DRX cycle. The embodiments of the present invention are therefore not restricted to any particular type of DRX cycle nor are they restricted to any specific value of the scaling factor. However, it should be noted that in order to assure reliability given the number of samples that may be required for evaluating the radio link failure, the scaling factor should be appropriately selected so that the evaluation period for long DRX cycles does not become unacceptable for e.g. maintaining handover performance. As an example, 5 samples for a DRX cycle length of 2.56 sec (long DRX cycle) correspond to more than 10 seconds of evaluation period assuming one sample is obtained every DRX cycle. Thus the scaling factor for the timer should be multiple of 5×DRX cycle e.g. 25.6 seconds. In other words the scaling factor is 10 times the DRX in this example.

According to an embodiment of the present invention, the scaling factor can be transmitted/signalled, in a configuration message, from the base station (i.e. eNodeB or eNB) to the UE so that the UE can adapt the one or several high layer filtering parameters (i.e. counters and timers, etc.) based on the received scaling factor. The signalling of the scaling factor can be used in order to avoid providing the UE with multiple values of e.g. counters and timers (thus avoiding increasing the size of configuration messages).

According to yet another exemplary embodiment of the present invention, the scaling factor can be a predetermined or a predefined value in the UE. This predefined value can be known by the eNodeB and therefore no need for the eNodeB to signal the scaling factor. It should be mentioned that the duration of the current scaling factor the UE is using is generally known by the eNodeB. However, depending upon the status of the activity level, which is governed by the network configured timer, the UE is also allowed to autonomously change the type of DRX cycle that it uses, e.g. from long DRX cycle to a short DRX cycle, depending on the activity level. For instance if the UE, originally in the short DRX cycle state, is not scheduled over certain time period specified by the network controller then the UE will switch to the longer DRX cycle. Since the network is fully aware of the activity level, it can determine the UE state of the DRX cycle at any given time.

As mentioned earlier, the higher layer filtering parameters may also include a counter for in-sync, previously denoted Cis that counts the number of Qin indications from the physical layer for evaluation purposes, e.g. for detecting in-sync between the UE and the eNodeB. This counter can also be scaled by the UE based on a scaling factor that is received from the eNodeB or that is a predetermined scaling value. A similar function F as the one defined in equations (1) and (2) can also be used by the UE to adapt Cis. An example of such a function F is given in equation (3) below:

$$Cis(i) = F(K_2, D_{DRX,i}) \quad (3),$$

where $K_2$ denotes a scaling factor and $D_{DRX,i}$ denotes a current DRX cycle having a length i that the UE is using. Also here, the DRX cycle can be long or short or can have any appropriate length.

A suitable function F can be expressed according to equation (4) below:

$$Cis(i) = K_2 \times D_{DRX,i} \quad (4)$$

It should be noted that the scaling factors $K_1$ and $K_2$ are not necessarily different i.e. the UE can use the same scaling factor (e.g. $K_C = K_1 = K_2$) for adapting Coos (out-of-sync counter) and Cis (in-sync counter) which are then used to evaluate radio link failure.

Similar expressions to those for counters given in equations (1)-(4) can also be defined for the out-of-sync and in-sync timers. Thus the UE can adapt the out-of-sync timer, denoted Toos, as a function of the current DRX cycle having length i and as a function of a scaling factor, denoted $K_3$ and e.g. starts Toos when the number of out-of-sync indications reaches Coos and stops the adapted timer when the number of in-sync indications reaches Cis. The out-of-sync timer is thus used to observe out-of-sync between the UE and the base station and is used for setting the duration over which the UE evaluates the radio link failure between it the base station. Equation (5) below expresses the timer Toos as a function of the DRX cycle of length i and the scaling factor $K_3$:

$$Toos(i)=F(K_3,D_{DRX,i}) \quad (5)$$

A suitable function F can be expressed according to equation (6) below:

$$Toos(i)=K_3 \times D_{DRX,i} \quad (6)$$

Again, the scaling factor $K_3$ can be a predetermined value that is known by the UE and the eNodeB or can be signalled by the eNodeB in a configuration message. In the latter case, only $K_3$ needs to be signalled and the timer is then adapted using equation (5) or (6).

A similar function F can also be defined for the in-sync timer denoted Tis which is used for observing in-sync between the UE and the base station and is used for setting the duration over which the UE evaluates the radio link failure between it the base station. The timer Tis can be expressed as follows:

$$Tis(i)=F(K_4,D_{DRX,i}) \quad (7),$$

where $K_4$ denotes a scaling factor and $D_{DRX,\,i}$ denotes a current DRX cycle having a length i that the UE is using. Also here, the DRX cycle can be long or short or can have any appropriate length.

A suitable function F can be expressed according to equation (8) below:

$$Tis(i)=K_4 \times D_{DRX,i} \quad (8)$$

It should be noted that the scaling factors $K_3$ and $K_4$ are not necessarily different i.e. the UE can use the same scaling factor (e.g. $K_T=K_3=K_4$) for adapting Toos (out-of-sync timer) and Tis (in-sync timer) which are then used to evaluate radio link failure.

Yet another generalization or simplification is to use the same scaling factor for both the counters and the timers i.e. by setting $K_C=K_T=K$. The scaling factor K can be signalled by the eNodeB to the UE or can be a predetermined value known to the UE and the eNodeB.

It should also be noted that any suitable function F can be used. Such a function can for example be defined in a standard i.e. technical specification document(s) that deal with radio link failure handling in e.g. E-UTRA and/or UTRA. Examples of technical specifications have been previously mentioned. It should be noted that the exemplary embodiments of the present invention are note restricted to only counters and timers, i.e. other types of higher layer filtering parameters may also be adapted in accordance with the embodiments of the present invention. Such filtering parameters that may be adapted are e.g. filtering coefficients that are associated with radio link failure detection mechanisms.

Figure 3:
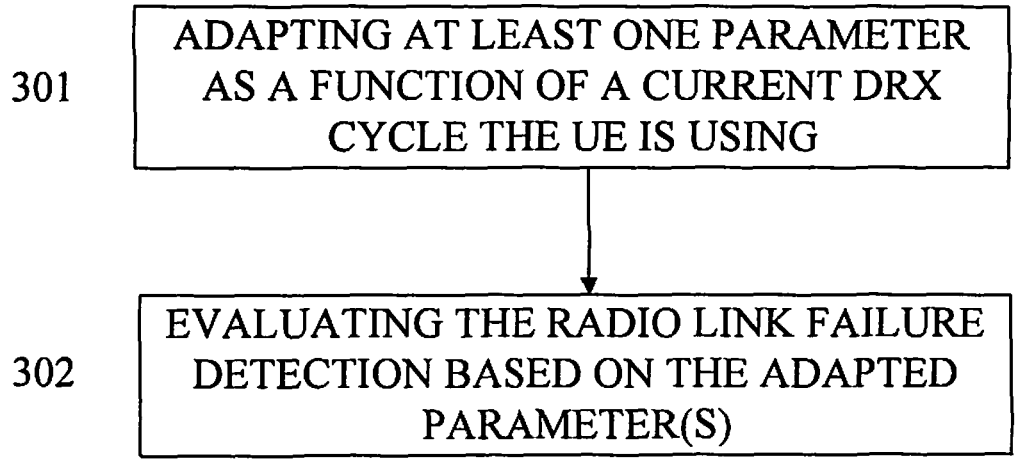
FIG. 3 is a diagram illustrating a flowchart of a method performed in a user equipment according to exemplary embodiments of the present invention.

Referring to FIG. 3, there is illustrated a flowchart of a method, performed by a UE capable in detecting radio link failure between it and a base station. The UE is configured to adapt at least on parameter (e.g. timer or counter) according to the previously described exemplary embodiments of the present invention. The parameter(s), which can be high layer filtering parameters, are used in radio link failure evaluation i.e. used to evaluate and detect radio link failure between the UE and a (serving) base station (or (serving) eNodeB). The UE is capable of operating in DRX mode having at least one DRX cycle. As shown in FIG. 3, the main steps of the method comprise:

(301) adapting at least one parameter (e.g. counter and/or timer) as a function of a current DRX cycle (long or short etc.) the UE is using; and (302) evaluating the radio link failure detection based on the adapted parameter(s).

As mentioned earlier, the UE can adapt (or express) the parameter(s) as a function of the duration of the DRX cycle and a scaling factor which is either received from the eNodeB or is a predetermined value in the UE. Other embodiments of the method performed by the UE in accordance with the present invention have already been described and are therefore not repeated again.

Figure 4:
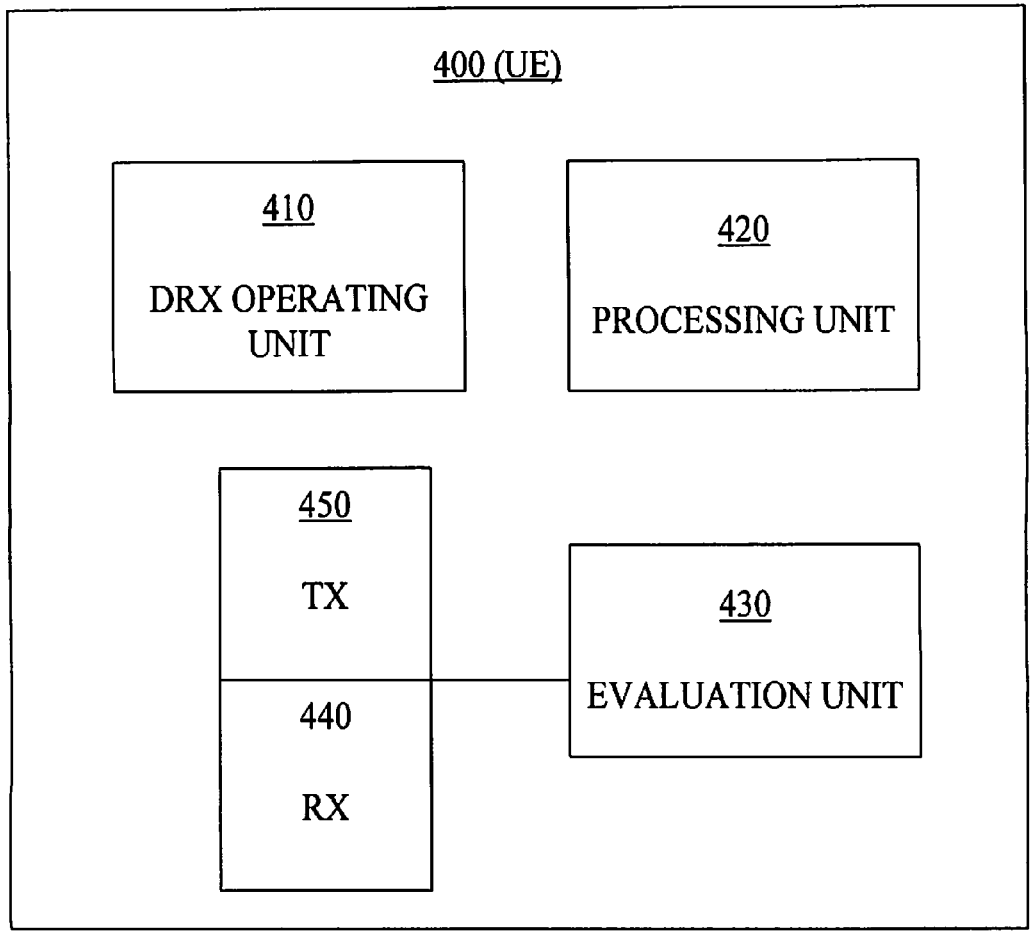
FIG. 4 illustrates a block diagram of an exemplary user equipment according to embodiments of the present invention.

Referring to FIG. 4, there is illustrated a block diagram of an exemplary UE 400 for performing the method of FIG. 3 and the different previously described embodiments of the present invention. As shown, the UE 400 includes a DRX operating unit comprising means 410 for enabling the UE 400 to operate in a DRX mode having at least one DRX cycle (e.g. short or long etc.); a processing unit comprising means 420 for adapting the one or several parameter (i.e. higher layer filtering parameters such as counters and/or timers) as a function of the current DRX cycle the UE 400 is using; and an evaluation unit comprising means 430 for evaluating radio link failure detection based on the one or several adapted parameters. The UE 400 further comprises a receiver unit comprising means 440 RX adapted to receive e.g. a configuration message (or messages) from the eNodeB. Such message(s) may comprise a scaling factor which the UE 200 can use to scale the duration of the current DRX cycle that is used by UE 400. The UE 400 further includes a transmitter unit comprising means 450 TX adapted to transmit to the eNodeB information related to reporting on radio link conditions after that the evaluating means 430 of the evaluation unit evaluated the radio link based on the adapted parameter. As mentioned before, the UE 400 is also configured to autonomously change a type of DRX cycle used depending on the activity level.

Additional actions performed by the UE have already been described and are therefore not unnecessarily repeated. It should however be mentioned that the different exemplary units shown in FIG. 4 are not necessarily separated. Furthermore the TX means 450 of the transmitter unit and the RX means 440 of the receiver unit are not necessarily included in a same unit i.e. they can be disjoint. The UE 400 is therefore not restricted and is not limited to the exemplary block diagrams shown in FIG. 4. In addition, the UE 400 may also comprise other element and/or units not illustrated in FIG. 4.

Referring to FIG. 5, there is illustrated a flowchart of a method, performed by a base station (e.g. eNodeB or eNB) for enabling a UE to detect radio link failure between it and the base station. The UE is capable of operating in DRX mode having at least one DRX cycle. As shown in FIG. 5, the main steps performed in the base station 5 comprise:

(501) transmitting (or signalling) a scaling factor to the UE which adapts one or several parameters as a function of the scaling factor and on the duration of the current DRX cycle; and; The one or several parameters (i.e. high layer filtering parameters such as timers and counters are used in radio link failure evaluation.

(502) receiving, from the UE, information relating to a reporting on radio link conditions, after that the UE has evaluated the radio link failure (RLF) detection based on the adapted parameter(s).

It should be noted that if the UE and the eNodeB already have knowledge of the scaling factor during the current DRX cycle, the UE can adapt the parameter(s) based on a predetermined value of the scaling factor and therefore it is unnecessary for the eNodeB to signal (or transmit) the scaling factor to the UE.

Figure 6:
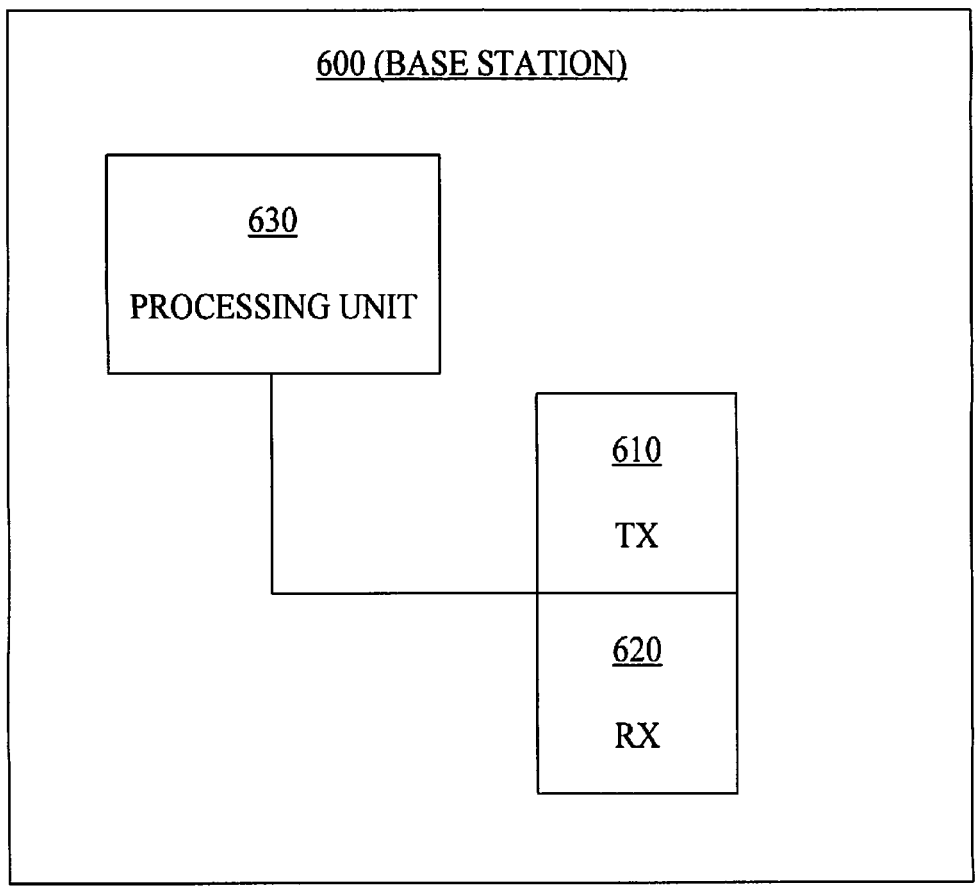
FIG. 6 is a block diagram illustrating an exemplary base station in accordance with exemplary embodiments of the present invention.

Referring to FIG. 6 there is illustrates a block diagram of an exemplary base station 600 (e.g. eNodeB or eNB) for enabling a UE to detect radio link failure between it and the base station (600). The UE is configured to adapt at least one parameter used to evaluate and detect radio link failure between it and the base station 600. As mentioned before, the UE is configured to operate in DRX mode having at least one DRX cycle (long or short).

As shown in FIG. 6, the base station 600 includes a transmitter unit comprising transmitting means TX 610 that is configured to transmit (or signal) a scaling factor to the UE. The UE can then use the received scaling factor to adapt the one or several parameters as a function of the scaling factor and as a function of the length or duration or period of the current DRX cycle. The scaling factor can be sent in a configuration message.

Referring back to FIG. 6, the base station 600 further includes a receiver unit comprising receiving means RX 620 configured to receive, after evaluation by the UE of the radio link based on the adapted parameter(s), information relating to a reporting on radio link conditions. Note that the different exemplary units shown in FIG. 6 are not necessarily separated. The base station 600 may also include a processing unit comprising processing means 630 for e.g. processing information received/transmitted from/to one or several UEs. Although the base station 600 may comprises additional elements and/or units such as integrated circuits and discrete components which are known by a person skilled in the art, these additional elements and units are not illustrated in FIG. 6.

The embodiments of the present invention can be realised in many ways. As an example, suitable processors in associations with software and hardware means may be used to implement the method claims related to the UE and the method claims related to the base station. For example, one embodiment of the present invention includes a computer-readable medium having instructions stored thereon that are executable by a UE. The instructions when executed perform the method steps related to the UE as set forth in the claims.

Furthermore, the exemplary embodiments of the present invention may be implemented in any type of wireless communications system that employs DRX modes of operation. By way of example, the exemplary embodiments of the present invention may be implemented in a non-limiting general context in relation to a 3G LTE concept and/or UMTS and/or WiMAX and/or HSPA and/or HSDPA (high speed downlink packet access) and/or HSUPA.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the embodiments of the present invention.

The invention claimed is:

1. A method for use in a user equipment, UE, for detection of radio link failure between the UE and a base station of a telecommunications system wherein the UE is capable of operating in a discontinuous reception, DRX, mode having at least one DRX cycle, the method comprising:
adapting at least one parameter, used in radio link failure evaluation at a higher level than a physical level, to be a function of a current DRX cycle said UE is using; and
evaluating radio link failure detection based on said at least one adapted parameter.

2. The method according to claim 1 comprises adapting said at least one parameter as a function of the duration of said DRX cycle and a scaling factor.

3. The method according to claim 2 comprises receiving said scaling factor from the base station and adapting said at least one parameter as a function of the duration of the DRX cycle by scaling the duration of the DRX cycle using said received scaling factor.

4. The method according to claim 2 comprises using a predetermined scaling factor that is known by said base station and adapting said at least one parameter as a function of the duration of the DRX cycle by scaling the duration of the DRX cycle using said predetermined scaling factor.

5. The method according to claim 1, wherein said UE is capable of operating in DRX mode and in radio resource control connected, RRC_CONNECTED, mode.

6. The method according to claim 1, further comprises transmitting, to said base station, information related to reporting on radio link conditions, after that the UE evaluated the radio link based on said at least one adapted parameter.

7. The method according to claim 2, wherein said adapting, said at least one parameter corresponds to a timer which is adapted as a function of the DRX cycle, and is used for setting the duration over which the UE evaluates the radio link failure between the UE and the base station.

8. The method according to claim 7 comprises adapting the timer by scaling the duration of the DRX cycle using the scaling factor.

9. The method according to claim 7 wherein the timer corresponds to a timer for observing out of synchronisation, out-of-sync, between the UE and the base station in order to evaluate radio link failure detection.

10. The method according to claim 7 wherein the timer corresponds to a timer for observing in-synchronisation, in-sync, between the UE and the base station.

11. The method according to claim 2, wherein said adapting, said at least one parameter corresponds to a counter which is adapted as a function of the DRX cycle, and used by the UE to evaluate radio link failure between the UE and the base station.

12. The method according to claim 11 comprises adapting the counter by scaling the duration of the DRX cycle using the scaling factor.

13. The method according to claim 11 wherein the counter corresponds to a counter for counting out-of-sync between the UE and the base station in order to evaluate radio link failure detection.

14. The method according to claim 11 wherein the counter corresponds to a counter for counting in-sync between the UE and the base station.

15. The method according to claim 1, wherein the current DRX cycle said UE is using is a short DRX cycle or a long DRX cycle, and the method further comprises autonomously changing a type of DRX cycle the UE is using depending upon activity level.

16. The method according to claim 2, wherein the scaling factor is dependent on at least one service used by the UE.

17. A user equipment, UE, capable of detecting radio link failure between the UE and a base station of a telecommunications system, the UE comprising:
means for operating in discontinuous reception, DRX, mode having at least one DRX cycle;
means for adapting at least one parameter, used in radio link failure evaluation at a higher level than a physical level, such as to be a function of a current DRX cycle the UE is using; and means for evaluating radio link failure detection based on said at least one adapted parameter.

18. The UE according to claim 17 wherein said means for adapting is configured to adapt said at least one parameter as a function of the duration of the DRX cycle and a scaling factor.

19. The UE according to claim 18 further comprises means for receiving the scaling factor from the base station and the means for adapting is configured to adapt said at least one parameter as a function of the duration of the DRX cycle, by scaling the duration of the DRX cycle using the received scaling factor.

20. The UE according to claim 18 is configured to use a predetermined scaling factor that is known by said base station and the means for adapting is configured to adapt said at least one parameter as a function of the duration of the DRX cycle by scaling the duration of the DRX cycle using said predetermined scaling factor.

21. The UE according to claim 17, further comprises means for transmitting, to said base station, information related to reporting on radio link conditions, after that the means for evaluating evaluated the radio link based on said at least one adapted parameter.

22. The UE according to claim 17, wherein said at least one parameter corresponds to a timer.

23. The UE according to claim 22 wherein the timer is a timer used for observing out of synchronisation, out-of-sync, between the UE and the base station in order to evaluate radio link failure detection.

24. The UE according to claim 22 wherein the timer is a timer for observing in-synchronisation, in-sync, between the UE and the base station.

25. The UE according to claim 17, wherein said at least one parameter corresponds to a counter.

26. The UE according to claim 25 wherein said counter corresponds to a counter for counting out-of-sync between the UE and the base station in order to evaluate radio link failure detection.

27. The UE according to claim 25 wherein the counter is a counter for counting in-sync between the UE and the base station.

28. The UE according to claim 17, wherein the current DRX cycle said UE is using is a short DRX cycle or a long DRX cycle, and the UE is further configured to autonomously change a type of DRX cycle used depending upon activity level.

29. The UE according to claim 18, wherein the scaling factor is dependent on at least one service used by the UE.

30. A base station for enabling a user equipment, UE, to detect radio link failure between the UE and a base station, the UE is configured to operate in discontinuous reception, DRX, mode having at least one DRX cycle; said base station comprising:
  means for transmitting a scaling factor to the UE which adapts at least one parameter used in radio link failure evaluation, as a function of a current DRX cycle that is used and the scaling factor transmitted by the base station to the UE; and
  means for receiving information from the UE after evaluation by the UE of the radio link based on said at least one adapted parameter, said information relating to a reporting by the UE on radio link conditions.

31. A method for use in a base station, for enabling a user equipment, UE, to detect radio link failure between the UE and a base station, the method comprising:
  transmitting a scaling factor to the UE, said UE is configured to operate in discontinuous reception, DRX, mode having a DRX cycle, and the UE is further configured to adapt at least one parameter, used in radio link failure evaluation as a function of the DRX cycle and the scaling factor transmitted by the base station to the UE; and
  receiving information from the UE after evaluation by the UE of the radio link based on said at least one adapted parameter, said information relating to a reporting by the UE on radio link conditions.

* * * * *

UNITED STATES PATENT AND TRADEMARK OFFICE
CERTIFICATE OF CORRECTION

PATENT NO. : 8,472,362 B2  
APPLICATION NO. : 13/121097  
DATED : June 25, 2013  
INVENTOR(S) : Kenehan et al.

Page 1 of 1

It is certified that error appears in the above-identified patent and that said Letters Patent is hereby corrected as shown below:

On the Title Page, item (57), under "ABSTRACT", in Column 2, Line 7,
delete "base station (200)." and insert -- base station (600). --, therefor.

On the Title Page, item (57), under "ABSTRACT", in Column 2, Lines 13-16,
delete "based on the parameters. After evaluation, the UE (400) is further configured
to evaluate radio link failure detection based on the one or several adapted parameters."
and insert -- based on the one or several adapted parameters --, therefor.

On Title Page 2, item (56), under "OTHER PUBLICATIONS", in Column 1,
Line 6, delete "Physical;Physical" and insert -- Physical --, therefor.

In the Drawings:

In Fig. 2, Sheet 2 of 6, for Tag "221", in Line 1, delete "eNodeB 1" and insert -- eNodeB 2 --, therefor.

In Fig. 2, Sheet 2 of 6, for Tag "222", in Line 1, delete "eNodeB 1" and insert -- eNodeB 3 --, therefor.

In the Specification:

In Column 7, Line 57, delete "$D_{DRS,\ 1}$." and insert -- $D_{DRX,\ 1}$. --, therefor.

In Column 8, Line 44, in Equation (3), delete "$Cis(i=F(K_2,D_{DRX,i})$" and insert
-- $Cis(i)=F(K_2,D_{DRX,i})$ --, therefor.

In Column 10, Line 26, delete "UE 200" and insert -- UE 400 --, therefor.

Signed and Sealed this
Nineteenth Day of August, 2014

Michelle K. Lee
*Deputy Director of the United States Patent and Trademark Office*